Figure 1:
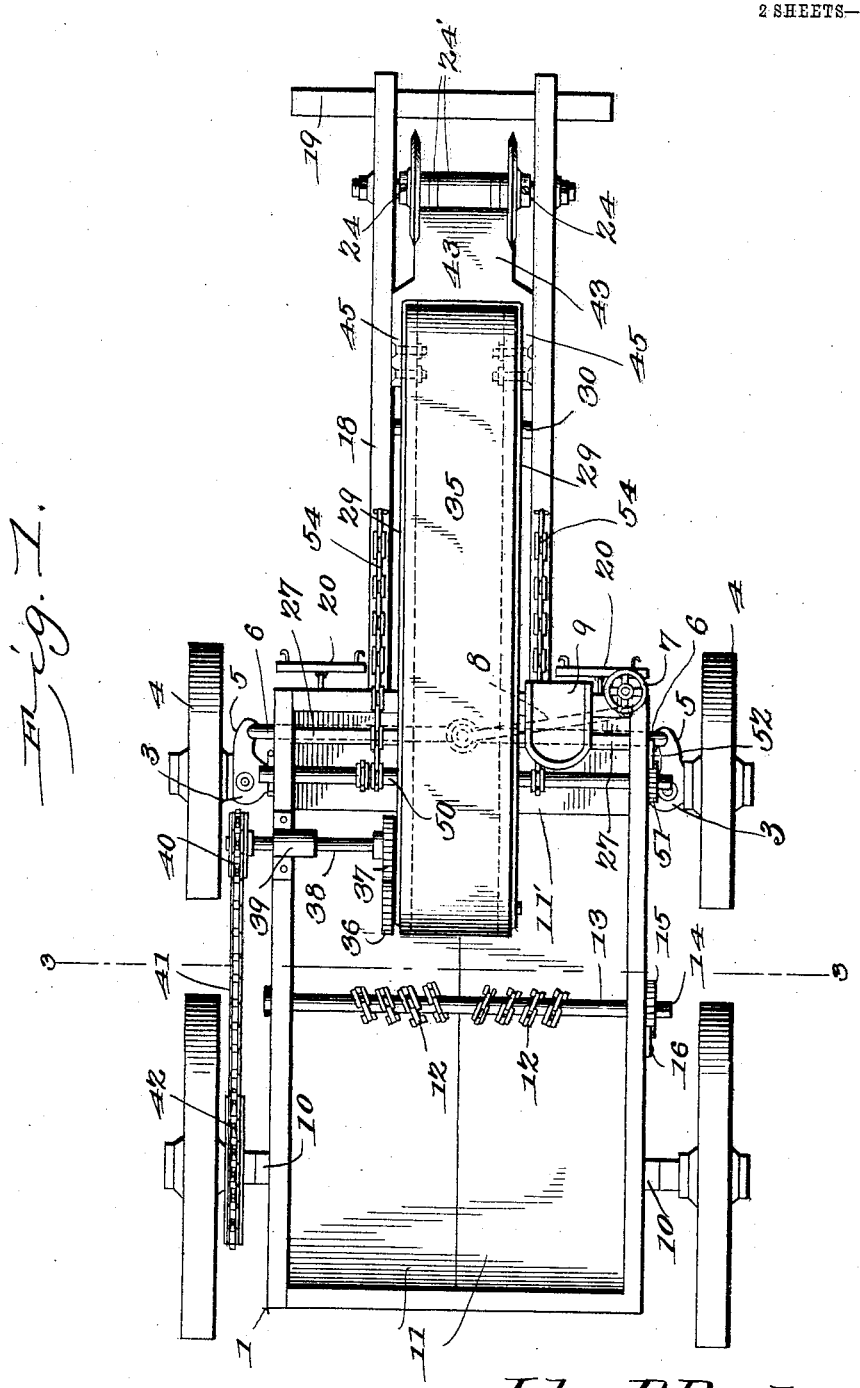

No. 785,708. PATENTED MAR. 28, 1905.
J. D. BUCHANAN.
EXCAVATING MACHINE.
APPLICATION FILED OCT. 24, 1904.

2 SHEETS—SHEET 1.

Witnesses
E. H. Stewart
Jno. E. Parker

John D. Buchanan,
Inventor,
by C. A. Snow & Co.
Attorneys

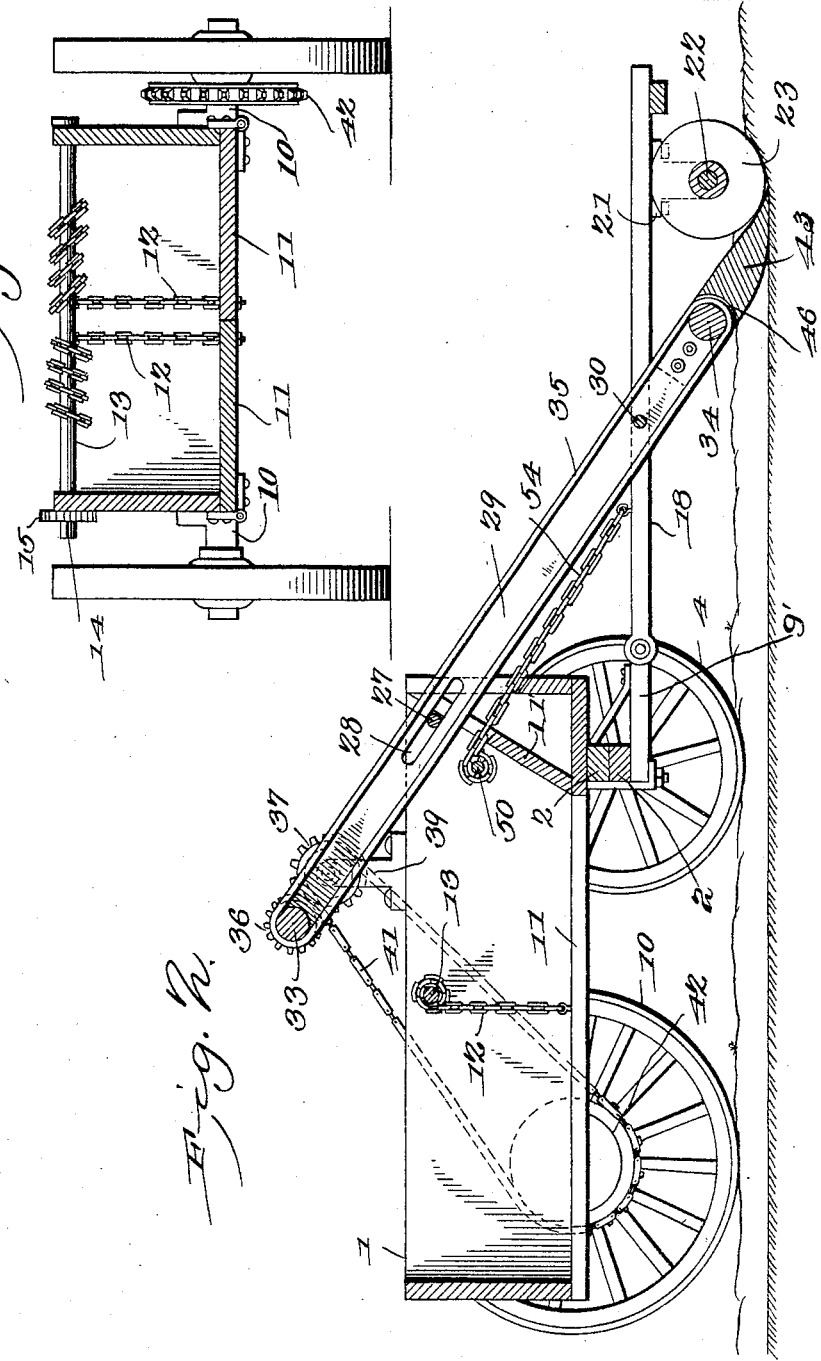

No. 785,708.

Patented March 28, 1905.

UNITED STATES PATENT OFFICE.

JOHN D. BUCHANAN, OF MEMPHIS, TENNESSEE.

EXCAVATING-MACHINE.

SPECIFICATION forming part of Letters Patent No. 785,708, dated March 28, 1905.

Original application filed July 29, 1904, Serial No. 218,718. Divided and this application filed October 24, 1904. Serial No. 229,788.

*To all whom it may concern:*

Be it known that I, JOHN D. BUCHANAN, a citizen of the United States, residing at Memphis, in the county of Shelby and State of Tennessee, have invented a new and useful Excavating-Machine, of which the following is a specification.

The principal object of the present invention is to provide a wheeled carrier having a receptacle of large capacity so arranged that the contents of the receptacle may be dumped without interfering with the running-gear.

A still further object of the invention is to provide a wheeled carrier having a hinged bottom that extends across a plane including the axles of the rear wheels of the vehicle.

With these and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit of the invention or sacrificing any of its advantages.

In the accompanying drawings, Figure 1 is a longitudinal sectional elevation of a wheeled carrier constructed in accordance with the invention and showing the same as employed in connection with an excavating device. Fig. 2 is a plan view of the same. Fig. 3 is a transverse sectional elevation of the carrier on the line 3 3 of Fig. 1.

Similar numerals of reference are employed to indicate corresponding parts throughout the several figures of the drawings.

The device forming the subject of the present invention is intended principally to be used in connection with an excavating mechanism of the character shown and described in an application for Letters Patent filed by me on July 29, 1904, Serial No. 218,718, and of which the present application is a division.

The vehicle comprises a body portion 1, having a pair of rigid transversely-disposed bolsters 2 in alinement with the axis of the front wheel, and to the outer ends of these bolsters are pivoted short axle members 3 for the support of the front wheels 4, said axle members being provided with projecting arms 5, that are connected together by a transversely-disposed link 6. To the link is connected a steering-wheel 7, the connection being made by a suitable rack or by an auxiliary link, as 8, in order that both of the front wheels may simultaneously move in steering the vehicle. The steering-wheel is located within convenient reach of the driver's seat 9. The rear wheels are mounted on stud-axles 10, projecting from the stationary sides of the vehicle-body and leaving the whole of the bottom of the vehicle clear. The bottom is formed of a pair of hinged doors 11, that are connected by chains 12 to a winding shaft or drum 13, extending transversely across the upper portion of the vehicle-body and provided at one end with a non-circular portion 14, to which a winding-crank is fitted, and in order to hold the doors in closed position the shaft is further provided with a ratchet-wheel 15, with which engages a pawl 16, pivoted to one side of the body portion.

It will be noted that the two hinged bottom members 11 extend completely across the body of the vehicle and in the direction of the length of said vehicle and pass or cross the vertical plane of the rear wheel-axles, so that said members may be swung down to permit the dumping of the whole of the contents of the dirt-receptacle without interfering with the running-gear and without rendering it necessary to employ a shovel or similar means for unloading said vehicle. The hinged bottom members extend from the rear wall or end gate to the lower end of an inclined front piece or partition 11', this being arranged so that the dirt will be dumped to the rear of the front bolsters.

To the bolsters at the front of the vehicle are secured brackets 9' and to these is pivoted a double tongue 18, the two members of which are spaced for a distance sufficient to permit of the introduction of the excavating devices between them, and at the front end of the tongues is a transversely-extending breast-bar 19. At a convenient point on each side of the double tongue are arranged swingle or double trees 20, to which the draft-animals may be hitched.

To the members of the tongue 18 are secured hangers 21, forming bearings for a transversely-disposed shaft 22, on which are arranged a pair of colters or cutting-disks 23, the hubs of the colters being provided with threaded openings for the passage of set-screws 24, by which said colters may be locked in any desired position on the shaft. The colters are held in spaced relation by a plurality of sleeves 24', one or more of which may be removed should it be desired to alter the distance between the colters, and thus alter the width of the cut.

The opposite side members of the vehicle-body are provided with bearings or supports for the reception of a transverse bar 27, which extends through a pair of slots 28, formed in a pair of parallel bars 29, constituting the frame of the conveyer mechanism, and said bar forms a support for the upper portion of said mechanism. The lower portion of the conveyer is held in place by a transverse bolt 30, extending through the frame members 29 and the two tongues 18. At the upper and lower ends of the side bars 29 are bearings for the reception of transversely-disposed drums or rollers 33 34, over which extends an endless conveyer 35, formed of any suitable material. The shaft or spindle of the upper roller 33 is provided with a gear 36, which intermeshes with a gear 37, carried by a shaft 38, that is supported in bearings formed in a bracket 39, carried by one of the side members of the vehicle-body. The outer end of the shaft 38 carries a sprocket-wheel 40, that is connected by a link belt 41 to a sprocket-wheel 42, carried by one of the rear wheels, and as the machine is going along motion is transmitted through the gearing to the conveyer, and any excavated material deposited thereon will be carried up and dumped into the dirt-receptacle.

To the lower ends of the side bars of the conveyer-frame is secured a shovel or cutter 43 of a width corresponding to the distance between the two colters, and from the rear portion of the cutter extends arms 45, that are bolted or otherwise secured to the ends of the side bars, so that the cutter may be readily removed should repairs be necessary or when it is desired to substitute therefor a cutter of a different width. The rear portion of the cutter is concaved, as indicated at 46, and fits comparatively close to the conveyer-belt, so that little or no dirt will fall to the ground.

Extending transversely across the body portion of the vehicle is a winding shaft or drum 50, provided at one end or at both ends with non-circular portions for the reception of a winding-crank, and said shaft is further provided with a ratchet-wheel 51, with which engages a pawl 52, in order to hold the shaft from revolving. This shaft carries a pair of chains 54, the outer ends of which are connected to the two tongues 18, and when the shaft is turned in the proper direction the tongues will be moved until the colters and the cutter 43 are clear of the ground. This operative movement forces the members of the conveyer-frame to slide rearward of the transverse bar 27, and this results in the automatic disconnection of the gears 36 and 37, so that the vehicle may be traveled to the point where the excavated material is to be dumped without continuous operation of the conveyer.

Having thus described the invention, what is claimed is—

1. The combination with a wheeled frame having stud-axles projecting from its opposite sides for the reception of the rear wheels, and a pair of hinged members forming the bottom of the dirt-receptacle, said members extending across a plane including the axes of said rear wheels.

2. In a device of the class described, a frame including a receptacle, hinged members forming the bottom of said receptacle, front wheels, and rear wheels for supporting the frame, and studs forming journals for said rear wheels, said studs being secured to the opposite sides of the frame.

3. In a device of the class specified, a frame including side and front and rear walls, studs secured to the opposite side walls, rear wheels mounted on said studs, bolsters at the front of the frame, front wheels carried by the bolsters, and hinged bottom members extending from said bolsters to the rear wall of the receptacle and extending across the vertical plane of the studs.

In testimony that I claim the foregoing as my own I have hereto affixed my signature in the presence of two witnesses.

JOHN D. BUCHANAN.

Witnesses:
C. N. CHURCHILL,
A. A. POWELL.